(12) United States Patent
Adda et al.

(10) Patent No.: US 11,750,615 B1
(45) Date of Patent: Sep. 5, 2023

(54) SECURING DEVELOPMENT AND OPERATIONS PIPELINES

(71) Applicant: CyberArk Software Ltd., Petach-Tikva (IL)

(72) Inventors: Gil Adda, Petach-Tikva (IL); Daniel Schwartzer, Petach-Tikva (IL); Yoel Yaffe, Petach-Tikva (IL); Erez Waisbard, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 17/937,300

(22) Filed: Sep. 30, 2022

(51) Int. Cl.
*H04L 9/40* (2022.01)
(52) U.S. Cl.
CPC .................. *H04L 63/101* (2013.01)
(58) Field of Classification Search
CPC ...................................... H04L 63/101
See application file for complete search history.

(56) References Cited

U.S. PATENT DOCUMENTS

| | | | | |
|---|---|---|---|---|
| 10,623,446 | B1* | 4/2020 | Staler | H04L 63/101 |
| 2014/0189808 | A1* | 7/2014 | Mahaffey | G06F 21/31 |
| | | | | 726/4 |
| 2014/0304808 | A1* | 10/2014 | Martini | G06F 21/44 |
| | | | | 726/19 |
| 2017/0041146 | A1* | 2/2017 | Davis | H04L 9/0872 |
| 2021/0232393 | A1* | 7/2021 | Muddakkagari | G06F 8/77 |
| 2022/0121479 | A1* | 4/2022 | Chivukula | G06F 9/5005 |

* cited by examiner

*Primary Examiner* — Yonas A Bayou
(74) *Attorney, Agent, or Firm* — FINNEGAN, HENDERSON, FARABOW, GARRETT & DUNNER, LLP

(57) ABSTRACT

Disclosed embodiments relate to systems and methods for securely handling secrets by securing development and operations pipelines. Techniques include identifying a network access request for a process within the development and operations pipeline; accessing a result of at least one investigation of the process and the network access request, wherein the at least one investigation includes one of monitoring the process behavior, performing a process attestation, or performing an inspection of the network access request; determining whether to authorize the network access request; and conditional on whether the network access request is authorized, dynamically injecting a secret into the network access request, wherein the secret is not made available to the process itself.

24 Claims, 4 Drawing Sheets

SECURING DEVELOPMENT AND OPERATIONS PIPELINES

BACKGROUND

Technical Field

The present disclosure relates generally to securing development and operations pipelines and their environments, and more specifically, to systems and methods for securely handling secrets with a development and operations workflows to prevent an attacker from gaining access to the secrets.

Background Information

Individuals and organizations are increasingly relying on strong credentials to secure private and confidential information for business and personal use. These may include, for example, administrator or root credentials, which can allow broad or in some situations unlimited power to access network resources, create files, delete files, modify files, and the like. Even moderate-strength credentials may include some of these capabilities. With strong credentials like these comes the risk of misuse by malicious actors, both those internal to an organization and those operating from the outside.

Many applications use, for example, passwords in configuration files, where the masked password obscures a character-string representation of a real password. A user can then replace the real password in a configuration file with a new masked password. The same concept can also be applied to credential information. Many integration servers allow job configurations to be scripted and version-controlled, which makes migrating jobs to another environment more fluid and easy. These types of jobs are known as pipeline jobs and their environments are known as development and operations pipelines (also referred to as DevOps pipeline, continuous development or continuous deployment pipelines). A DevOps pipeline includes a set of automated processes and tools that allows both developers and operations professionals to work cohesively to build and deploy code to a production environment. While a DevOps pipeline can differ by organization, one of ordinary skill in the art would understand a DevOps pipeline includes various tools, assets and automation processes to perform build procedures, continuous integration, testing, validation, deployment and reporting. It may also include one or more manual gates that require human intervention before code is allowed to proceed. Continuous is a differentiated characteristic of a DevOps pipeline. This includes continuous integration and continuous delivery/deployment (CI/CD), continuous feedback, and continuous operations.

However, pipeline jobs often face the difficulty of needing credentials to log into other environments, network services, network resources, or systems. For example, an application created in a pipeline may require, when deployed, the ability to access a secure database, repository (e.g., source code repository, binary artifacts repository, etc.), or secure server. Depending on the situation, the database or server may be deployed or hosted by a third-party. When accessing such a secure system or environment, an application's credentials should not be stored as plaintext. If the credentials appeared as a plaintext file or exposed as environment variables, it would be easy for an outside party to access the credentials through, for example, build logs. The outside party may then create security vulnerabilities (e.g., through overt malicious actions, sharing of the credentials, insecure storage of the credentials, etc.) as well as performance risks (e.g., changing or rotating the credentials, etc.).

Conventional techniques prevent credentials from being exposed in build logs by masking them in a regular output. However, these approaches do not prevent attackers from using credentials in ways that are not intended by inserting snippets into the build pipeline tools or the build environment to unmask credentials. Accordingly, additional security measures are required to ensure that not everyone with control over a build script has access to its associated credentials. Some attempted solutions, for example, provide users with the ability to define credentials within different access control lists. For example, credentials stored on a root instance are likely to be available to all jobs within that root instance. By contrast, credentials stored in a folder will only be available to those with access to the specific folder. Attempted solutions may thus use access control mechanisms as a layer of protection against accidentally unmasking credentials because only pipelines inside the accessed folder can use the credentials without limitation. Attempted solutions may also store credentials in a secret store and then inject the credentials into the pipeline environment as plaintext. However, these solutions do not ensure that credentials are not captured since they are available as plaintext (e.g., after decryption), leaving these credentials vulnerable to be copied or stolen (e.g., copied from an environment variable). For example, credentials could be retrieved by a malicious attacker by using a build script that sends credentials to a network service created by an attacker, thus giving them access to the credentials and to the secure databases. These attacks are problematic because they involve infecting legitimate pipeline tools with infected snippets, which may then leak the credentials to an attacker's computer for illegitimate use by the attacker.

Accordingly, in view of these and other deficiencies in existing techniques, technological solutions are needed for securely handling secrets within a development and operations pipeline. In particular, solutions should advantageously provide protection for securing secrets associated with the pipeline rather than only focusing on keeping secrets in a safe place. Further, technological solutions can monitor the pipeline communications using a secure agent to monitor (e.g., each communication, select communications, or periodic communications) injection of the secrets into the pipeline. This helps ensure that no secrets are made available to the pipeline, and thus no secrets are made available to a potential attacker. The secure agent may provide an additional level of security, performing multiple security checks before injecting a secret into the pipeline.

SUMMARY

The disclosed embodiments describe non-transitory computer readable media, systems, and methods for securely handling secrets with a development and operations pipeline. For example, in an embodiment, a non-transitory computer readable medium may include instructions that, when executed by at least one processor, cause the at least one processor to perform operations for securely handling secrets within a development and operations pipeline. The operations may comprise identifying a network access request for a process within the development and operations pipeline. The operations may further comprise accessing a result of at least one investigation, wherein the at least one investigation includes at least one of monitoring the process behavior, performing a process attestation, or performing an inspection of the network access request. Based on the result of the at least one investigation, the operations further comprise determining whether to authorize the network access request. Conditional on whether the network access request is authorized, the operations may further comprise dynamically injecting a secret into the network access request, wherein the secret is not made available to the process itself.

According to a disclosed embodiment, performing an inspection of the network access request comprises inspecting at least one of network access request metadata, network access request connection parameters, or information embedded within the network access request.

According to a disclosed embodiment, the process attestation comprises inspecting at least one of attributes associated with the process or information related to a computing platform hosting the process.

According to a disclosed embodiment, the attributes associated with the process include at least one of process identification, process command binary attributes, a script invoked by the process, process loaded modules, process pedigree, or information associated with the process operating system.

According to a disclosed embodiment, the process modules may be dynamically loaded.

According to a disclosed embodiment, the information embedded within the network access request may comprise a payload inspection of information passed inside a request.

According to a disclosed embodiment, the determining comprises an application of at least one rule selected from a set of rules defined based on one of: rule training implemented using an automated analysis algorithm, manual settings implemented by a user, or an algorithm selected by a user.

According to a disclosed embodiment, the determining may be based on rule training implemented using an automated analysis algorithm.

According to a disclosed embodiment, the operations may also comprise performing a security scan of the network access request.

According to a disclosed embodiment, the secret is one among a plurality of secrets stored in a secured repository separate from the pipeline.

According to a disclosed embodiment, the secret may only be available through decryption during the injection.

According to a disclosed embodiment, the injected secret may be a direct secret. In some embodiments, a direct secret is a pre-defined secret.

According to a disclosed embodiment, the injected secret may be a derived secret. In some embodiments, a derived secret is generated or retrieved from an external resource.

According to a disclosed embodiment, based on the process attributes, injecting the secret may be associated with a role with privileges different than the privileges originally associated with the process.

According to a disclosed embodiment, the operations further comprise dynamically monitoring activity associated with the development and operations pipeline.

According to a disclosed embodiment, the activity may be displayed for observation using a user interface.

According to another disclosed embodiment, there may be a computer-implemented method for securely handling secrets within a development and operations pipeline. The method may comprise identifying a network access request for a process within the development and operations pipeline. The operations may further comprise accessing a result of at least one investigation, wherein the at least one investigation includes at least one of monitoring the process behavior, performing a process attestation, or performing an inspection of the network access request. Based on the result of the at least one investigation, the operations further comprise determining whether to authorize the network access request. Conditional on whether the network access request is authorized, the operations may further comprise dynamically injecting a secret into the network access request, wherein the secret is not made available to the process itself.

According to a disclosed embodiment, the method may be performed by a secure agent that has elevated privileges.

According to a disclosed embodiment, the secure agent may apply a rule selected from a set of rules.

According to a disclosed embodiment, the set of rules may be based on at least one of time parameters, a comparison of binary signatures associated with the process, a list of allowed actions, a list of banned actions, a list of allowed targets, a list of banned targets, a source network, a secret authorization, or a pairing of the process and a target allowed for access by the process.

According to a disclosed embodiment, the set of rules may be dynamically updated using an automated analysis algorithm that is trained on monitored activity.

According to a disclosed embodiment, the set of rules may be configured by an administrator.

According to a disclosed embodiment, the injecting of the secret may be from a secured repository.

According to a disclosed embodiment, the secure agent may be configured to send a notification upon injecting of the secret into the network access request.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
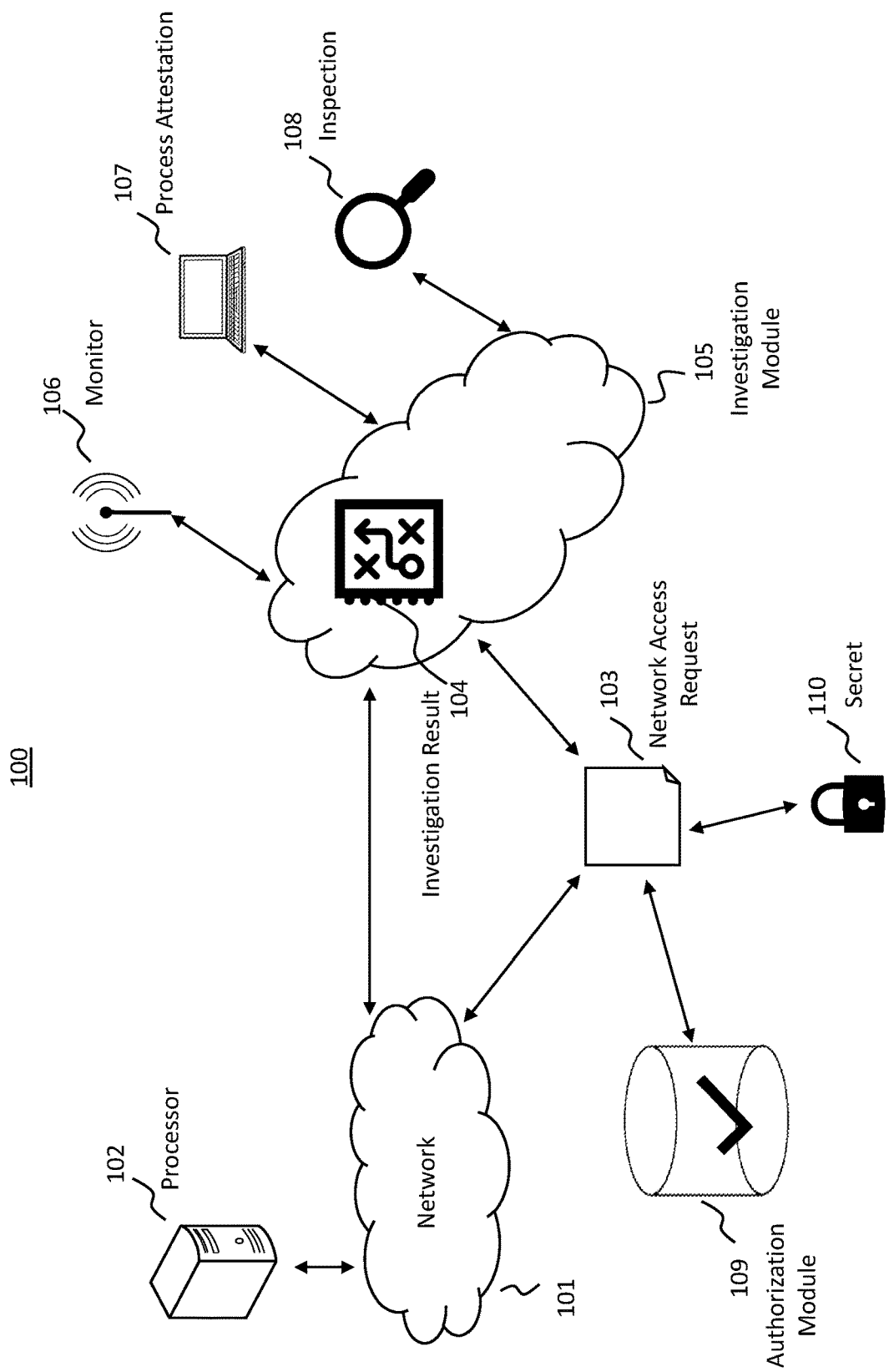
FIG. 1 illustrates an example system environment for securely handling secrets with a development and operations pipeline, consistent with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely handling secrets within a development and operations pipeline described herein overcome several technological problems relating to security, efficiency, and functionality in the fields of cybersecurity and software development. In particular, the disclosed embodiments provide techniques for securely handling secrets with a development and operations pipeline to prevent an attacker from gaining access to the secrets. As discussed above, many attempted techniques aim to prevent credentials from being exposed in a build log by masking them in a regular output. Attempted solutions also provide users with the ability to define credentials in different scopes. For example, credentials stored on a root are likely to be available to all jobs within that root instance. By contrast, credentials stored in a folder will only be available to those with access to the specific folder or files, as defined per the file system access control list (e.g., controlled by Microsoft Active Directory™, AWS Managed Microsoft AD™, Azure Active Directory™, IBM Cloud Active Directory™, or other alternatives other than Active Directory™. Such attempted solutions may use the folder as a layer of protection against accidentally revealing credentials because only pipelines associated with the folder can use the credentials without limitation. But relying on a file system access control list is a relatively weak security measure, since the credentials may still be copied or stolen. Attempted solutions may also store credentials in a secret store and then inject the credentials into the pipeline using plaintext. But in this technique the credentials are still accessible to malicious actors as plaintext, which results in security vulnerabilities. In contrast to these insecure and inefficient techniques, technological solutions are described below for securely handling secrets within a development and operations pipeline without making the secrets accessible as plaintext to malicious actors.

The disclosed embodiments provide technical solutions to overcome these and other problems. In particular, the disclosed techniques provide protection for securing secrets within a pipeline environment, rather than only focusing on keeping secrets in a safe place. Accordingly, the secrets are not easily accessible in the pipeline. Further, the disclosed techniques use a secure agent to monitor pipeline communications, ensuring that no secrets are made available to the pipeline, and thus to a potential attacker. The secure agent thus provides an additional level of security beyond previous attempted techniques at pipeline security. Accordingly, the disclosed embodiments provide techniques for secured handling of secrets within a development pipeline, which allows for more security of credentials and prevents a potential attack from occurring. The disclosed embodiments also provide increased security by simplifying pipelines, reducing the potential for attacks, and removing ease of accessibility to secret stores. For these, and other reasons that will be apparent to those skilled in the art from the disclosure herein, the disclosed techniques provide improved security by detecting suspicious activity of unknown process or detecting unexpected behavior of legitimate process, efficiency, and functionality over existing techniques.

Reference will now be made in detail to the disclosed embodiments, examples of which are illustrated in the accompanying drawings.

FIG. 1 illustrates an example system environment 100 for securely handling secrets within a development and operations pipeline. System environment 100 may act on, or in response to, a network access request 103, as described further below. For example, in embodiments described below the processes of FIGS. 3-4 may be initiated based on identifying or receiving a network access request 103. Further, in some embodiments the processes of FIGS. 3-4 may be carried out before (e.g., in anticipation of) receiving network access request 103.

The various components of system 100 may communicate over a network 101. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

In some embodiments, network 101 may be a pipeline environment. For example, network 101 may include or host a continuous development pipeline, continuous deployment pipeline, or the like. Examples of such development and operations environments may include Git™, Chef™, Ansible™, Jenkins™, Docker™, Maven™, Puppet™, Kubernetes™, or various others. In such a network 101, software (e.g., applications, programs, operating systems, patches, upgrades, updates, etc.) may be developed and deployed. Such software may be deployed within network 101 (e.g., to local network resources) or externally.

System 100 may also include a network access request 103. In some embodiments, the network access request seeks access to a development and operations pipeline. In some embodiments, the development and operations pipeline may seek access to network resources. The network resources may include, for instance, a code database or a software library repository. For example, the network access request 103 initiated by the development and operations pipeline environment may request to log-in to access a particular application code repository under development, to compile a new application version, to modify an application, to store or save a new version of an application (e.g., to a code versioning system), to deploy an application, etc. In some embodiments, the network access request 103 may seek access to an organizational information system by communicating through a network (e.g., network 101). Further, network access request 103 may seek access to a particular network resource from the pipeline. The process may be, for example, any logical or operational flow within the pipeline. The process may also include a parent process and its modules. For example, the process may be any organizational unit of an operating system, any segmentation of an operating system, any particular process thread, etc. The process binary and its modules are loaded during its initialization. In some embodiments, its modules are loaded dynamically while the process is running through dynamic linked libraries (DLL). In these various embodiments, processor 102 may identify network access request 103 as described further in connection with FIGS. 3-4, below.

System 100 may also include an investigation module 105. Investigation module 105 may include an application configured to perform monitoring process behavior or communications 106, process attestation 107, and an inspection 108. Investigation module 105 may also include at least one investigation result 104.

When investigation module 105 performs the monitoring function 106, this may include detecting and/or analyzing various types of communications in a development and operations pipeline environment (e.g., network 101). For example, the monitoring function 106 may include inspecting code being checked out, security scan operations, code linters, code compiling activity, code storing activity, tests run on code, code deployment activity, etc. In some embodiments, the investigation module 105 verifies that each process and its modules contain the correct properties to confirm they were not tampered with during their loading. These monitoring function 106 actions, which include monitoring process behavior and/or communications, are further discussed below in connection with FIGS. 3-4.

In some embodiments, process attestation 107 may include inspecting attributes associated with a particular pipeline process. In some embodiments, the attributes associated with the process include a process identification, process command binary attributes, a script invoked by the process, process loaded modules, a process pedigree, or information associated with the process operating system. In some embodiments, the process information may include identification information such as the process name, command line arguments, a binary file location, and a command binary checksum. In some embodiments, the process information may include a command version number. In additional embodiments, the process information may include a script invoked by the process and its properties. For example, the script may be interpreted by languages such as Python or Java™. In some embodiments the process loaded modules may be loaded dynamically. As an example, dynamically loading may be a mechanism by which the process loaded modules are run and can change over time. In some embodiments, dynamically loading the process modules may comprise loading the process modules by the process. In other embodiments, loading the process modules may comprise loading the process modules by the operating system. In some embodiments, the process pedigree is a process tree.

When investigation module 105 performs the inspecting function 108, this may include analyzing various types of data or metadata associated with network access request 103. For example, this may include analyzing a payload component of network access request 103. Further, this may include analyzing metadata or header field data of network access request 103. These inspection techniques are further discussed below in connection with FIGS. 3-4.

System 100 may also include authorization module 109. Authorization module 109 may determine whether to authorize network access request 103 based on investigation result 104. This authorization technique is further discussed below in connection with FIGS. 3-4.

System 100 may also include secret 110 that is usable in connection with the development and operations pipeline environment. Secret 110 may be, for example, a user and password, an API credential, temporary token, an SSH key, a system-to-system password, a client side certificate for secure communication, a private encryption key, a one-time password, or another credential of the same type, among other types of secrets. In accordance with FIG. 1 and system 100, the secret 110 may be usable to perform pipeline operations such as accessing code, accessing an application that is based on code, checking out code, performing a security or quality scan of code, operating a code linter, compiling code, storing a code artifact, running tests on code, deploying updated code, or other pipeline operations. In accordance with the techniques of FIGS. 3-4 discussed below, secret 110 may be injected into network access request 103 (or a modified version of network access request 103) if authorization module 109 authorized network access request 103. In some embodiments, secret 110 is not made available to the process itself in the pipeline. In some embodiments, authorization module 109 may not authorize network access request 103. In that event, if authorization module 109 does not authorize network access request 103, secret 110 may not be injected into network access request 103.

Figure 2:
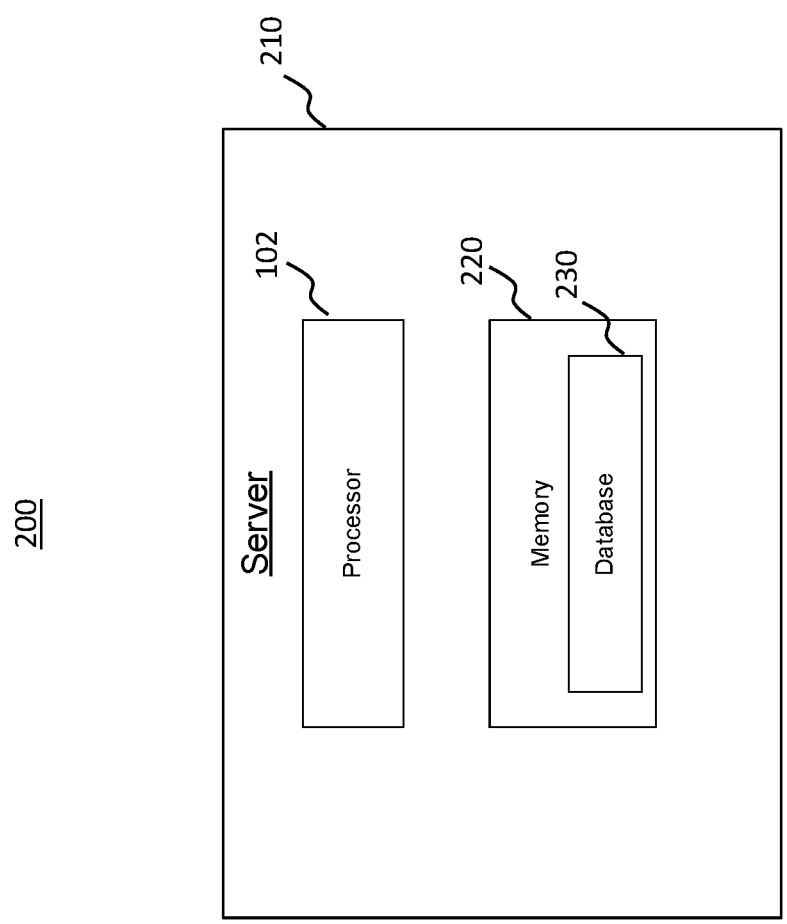
FIG. 2 is a block diagram showing an example server, consistent with disclosed embodiments.

FIG. 2 is a block diagram 200 showing an example server 210, consistent with the disclosed embodiments. Server 210 may be a computing device (e.g., a server, virtual machine, container instance, personal computer, mobile device, IoT device, etc.) and may include one or more associated processors 102 and/or memories 220.

Processor 102 may take the form of, but is not limited to, a microprocessor, embedded processor, or the like, or may be integrated in a system on a chip (SoC). Furthermore, according to some embodiments, processor 102 may be from the family of processors manufactured by Intel®, AMD®, Qualcomm®, Apple®, NVIDIA®, or the like. The processor 102 may also be based on the ARM architecture, a mobile processor, or a graphics processing unit, etc. The disclosed embodiments are not limited to any type of processor configured in server 210.

Memory 220 may include one or more storage devices configured to store instructions used by the processor 102 to perform functions related to server 210. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 102 may, in some embodiments, execute one or more programs (or portions thereof) remotely located from server 210. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a network drive, a cloud storage device, or any other storage device.

In some embodiments, memory 220 may include a database 230. Database 230 may be included on a volatile or non-volatile, magnetic, semiconductor, tape, optical, removable, non-removable, or other type of storage device or tangible or non-transitory computer-readable medium (e.g., memory 220). Database 230 may also be part of server 210 or separate from server 210. When database 230 is not part of server 210, server 210 may exchange data with database 230 via a communication link. Database 230 may include one or more memory devices that store data and instructions used to perform one or more features of the disclosed embodiments. Database 230 may include any suitable databases, ranging from small databases hosted on a work station to large databases distributed among data centers. Database 230 may also include any combination of one or more databases controlled by memory controller devices (e.g., server(s), etc.) or software. For example, database 230 may include document management systems, Microsoft SQL™ databases, SharePoint™ databases, Oracle™ databases, Sybase™ databases, other relational databases, or non-relational databases, such as mongo and others.

Figure 3:
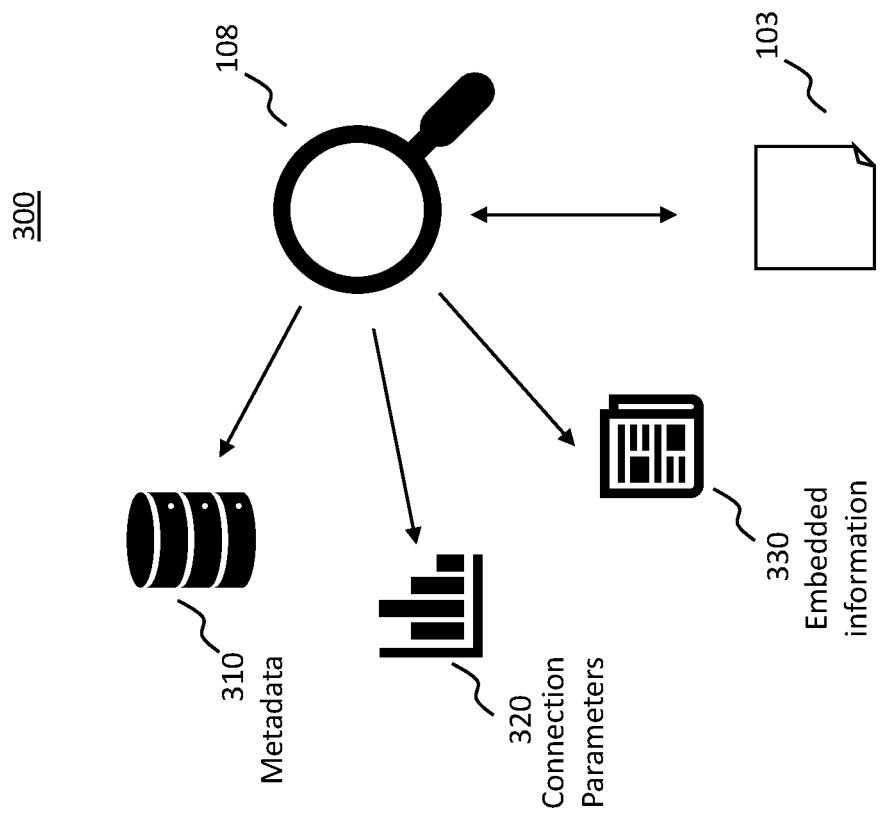
FIG. 3 illustrates an example inspection process of the network access request, consistent with disclosed embodiments.

FIG. 3 illustrates an example inspection process 300 of the network access request 103, consistent with the disclosed embodiments. For example, consistent with system 100 and FIG. 1, the inspection techniques of FIG. 3 may be performed as part of the inspection function 108 (e.g., performed by investigation module 105). The inspection function 108 may inspect various aspects of network access request 103, as discussed above. For example, inspection function 108 may inspect metadata 310 contained within network access request 103 (or associated with network access request 103). Metadata 310 may generally include data that provides information about other data, including a description of the other data. In some embodiments, for example, metadata 310 may include a time stamp, an identification, or a time zone associated with network access request 103. Inspection 108 may also inspect connection parameters 320. In some embodiments, connection parameters 320 are obtained from network access request 103 itself, and alternatively connection parameters 320 may be obtained external to network access request 103 (e.g., from processor 102, network 101, etc.). Connection parameters 320 may include a source and destination address and port, protocol, domain name system information, IP address information or other types of connection information. In some embodiments, the destination address and port is an IP protocol. In some embodiments the protocol may be TCP or UDP. Connection parameters 320 may indicate data such as an identity making the network access request 103, a software application sending or receiving the network access request 103, a type of the network access request 103 (e.g., to access, execute, modify, delete, create, etc.), or various other types of parameters. In accordance with FIG. 3, the inspection 108 may also inspect embedded information 330 associated with network access request 103. In some embodiments, embedded information 330 may include a payload inspection of information passed inside of network access request 103.

In some embodiments, the inspected information as part of inspection 108 is unencrypted, or was previously encrypted but has been decrypted. In this case, the information may be inspected without a decryption process needed. In some embodiments, the inspected information may be encrypted. For such scenarios, inspection 108 may include fetching a decryption key (e.g., symmetric cryptographic key or asymmetric cryptographic key) and decrypting the information to be inspected.

Figure 4:
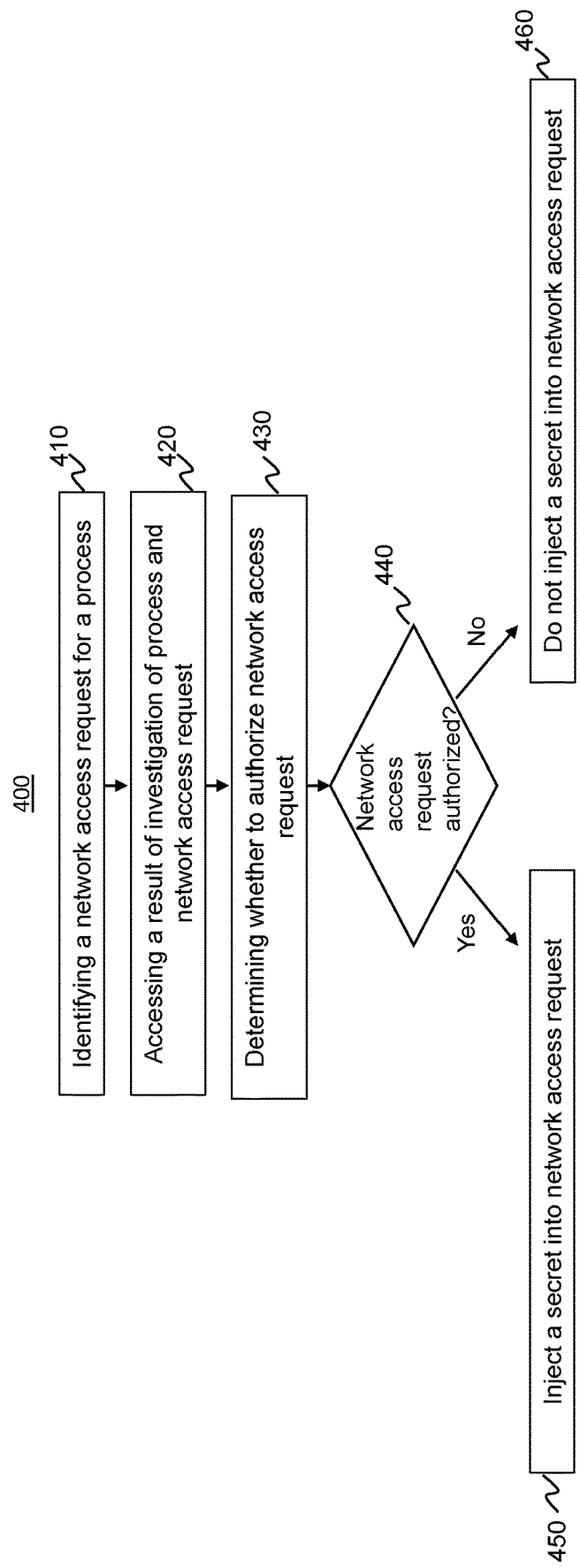
FIG. 4 is a flowchart showing an example process for securely handling secrets within a development and operations pipeline, consistent with disclosed embodiments.

FIG. 4 is a flowchart showing an example process 400 for securely handling secrets within a development and operations pipeline, consistent with disclosed embodiments. Process 400 may be performed by at least one processing device of a server, such as processor 102, as described above. In some embodiments, a non-transitory computer readable medium may contain instructions that when executed by a processor cause the processor to perform process 400. Further, process 400 is not necessarily limited to the steps shown in FIG. 4 and any steps or processes of the various embodiments described throughout the present disclosure may also be included in process 400.

In step 410, process 400 may include identifying a network access request for a process. For example, this may include receiving a network access request 103 for a process within a development and operations pipeline, as discussed above. In some embodiments, the network access request 103 may be identified by monitoring processes, behaviors, behavioral patterns, or communications in the development and operations pipeline. Alternatively, in some embodiments the network access request 103 may be identified by intercepting the network access request 103 as it is sent from a requesting application or identity. For example, the network access request 103 may be intercepted by a software agent running in the development and operations pipeline.

The network access request 103 may include, or may be associated with, sequences of code that are stored in a source code management system and compiled. For example, this may be a source code repository, artifacts repository, code versioning system, or other pipeline repository. As discussed above, tests may be run on the sequences of code and the sequences of code may be deployed. In some embodiments, the operations comprise performing a security scan of the network access request 103 after it is identified in step 410. In some embodiments, the security scan includes scanning one or more files included in the network request payload. In some embodiments, the scanning may comprise identification of patterns related to secrets leaking and sensitive data. For example, leaked secrets may be identified in a security scan that identifies secrets stored in plaintext in the development and operations pipeline. Further, leaked secrets may be identified based on communications logs identifying actual instances in which secrets have been communicated external to the pipeline, based on secrets matching a pattern of tokens, or based on secrets matching a pattern of API keys, etc. Further, leaked secrets may be identified based on reports of attempts to use the secrets (e.g., to access secure network resources).

In some embodiments, process 400 is performed by a secure agent. The secure agent may be, for example, an application, virtual machine instance, container instance, serverless code, etc. Depending on the implementation, the secure agent may operate within the development and operations environment itself, or separate from such environment. For example, the secure agent may be implemented as part of a continuous development or deployment infrastructure, or as part of a proxy server configured to intercept communications (e.g., network access request 103). In some embodiments, a secure agent enables secure communication within a development an operations pipeline. In some embodiments, the secure agent has elevated privileges. These elevated privileged may include, for example, root or administrator privileges. Alternatively, in some implementations elevated privileges may be understood to include all privileges above a certain threshold level (e.g., above a zero-privilege level, a guest or anonymous level, above a defined level, etc.). In some embodiments, the secure agent applies a rule selected from a set of rules. In some embodiments, the set of rules is based on predefined rules. In some embodiments, the set of rules is defined based on dynamic updates from an automated analysis algorithm that is trained on monitored activity. In some embodiments, the set of rules is configured by an administrator. In some embodiments, an administrator has full privileges with a network. In some embodiments, the set of rules is based on at least one of time parameters, a comparison of binary signatures with the process, a list of allowed actions, a list of banned actions, a list of allowed targets, a list of banned (e.g., blacklisted) targets, a source network, a secret authorization, or a pairing of the process and a target allowed for access by the process. In some embodiments, the list of allowed actions may include an http method to read information or perform an analysis. In some embodiments, the list of allowed actions may include putting a file on a database based on certain parameters. In some embodiments, the list of banned targets may include files that are not allowed on a database. In some embodiments, time parameters include time of day, the day of the week, or any other time-based parameters. In some embodiments, the comparison of binary signatures with the process involves comparing the allowed signatures of files and names, such as git, curl, pip, aws, cli, and the checksum of the allowed signatures of files and names. In other embodiments, the comparison of binary signatures with the process involves comparing the allowed script signatures. For example, a script signature may include get_it_dne.py. In some embodiments, the comparison is validated by confirming it was not changed. In some embodiments, comparison of binary signatures with the process involves confirming that the binary signatures have a parent. For example, the curl may be a child of 'jenkins.' In some embodiments, the comparison of binary signatures with the process involves confirming that the binary signatures have environment parameters. In some embodiments, an allowed target is an allowed hostname or an allowed IP address range that the process can access.

In step 420, process 400 may include accessing a result of an investigation of process 400. Consistent with above embodiments, the investigation may be performed by investigation module 105. In some embodiments, there may be more than one result of an investigation or process 400. The investigation may include multiple assessments, such as monitoring of process behavior or communications in monitoring function 106, process attestation 107, and inspection 108. Further, the inspection 108 may include analyzing metadata 310 associated with the network access request 103, connection parameters 320 of the network access request 103, and embedded information 330 of network access request 103.

In some embodiments, there may be more than one result of an investigation of the process. For example, the result of the investigation may be based on (e.g., computed, numerically) all of the investigation steps performed by investigation module 105 and all of the steps of inspection 108. Alternatively, the result of the investigation may report each of these steps individually. For example, numerical scores may be computed for each of the steps, or the results of the steps may be expressed qualitatively. Depending on the implementation, some but not all of the investigation steps performed by investigation module 105 and inspection 108 may be performed, and some but not all may be included in the result of the investigation.

In step 430, process 400 may include determining whether to authorize the network access request 103. In some embodiments, the determining is based on the result of the investigation from step 420. Further, the determining may be based on rules-based training implemented using an automated, machine-learning algorithm. For example, the rules-based training may include accessing previous network access requests 103 and previous authorization decisions in step 430. In other embodiments, the rules-based training is based on settings that are manually implemented by a user. For example, an administrator may manually implement the set of rules. In other embodiments, the set of rules is selected using an algorithm selected by a user. For each of the previous network access requests 103, the parameters associated with the request (e.g., as discussed above in connection with FIG. 3) may be assessed in terms of the authorization decision in step 430. Based on repeated analysis of such requests 103 and authorization decisions, the machine learning system may discern baselines of behavior. Once such baselines are determined (e.g., based on a set of given parameters, a given request should be authorized or not), new requests 103 may be compared to the baselines. In some embodiments, authorization is determined based on an insufficient confidence threshold. For example, if the confidence level for authorization is below a set amount, authorization may be denied. If a new request 103 is found to fall within a pattern of allowed behavior, it may be authorized in step 430, whereas a new request 103 falling outside of that pattern may be denied authorization in step 430. Various other parameters may also be analyzed in terms of network access requests 103 in the machine learning model. For example, the rule training may be based on the time of day, the day of the week, an identity of the requester, the level of access rights needed by the requester, previous activity by the requester, or various other parameters. In some embodiments, authorizing the network access request 103 further comprises utilizing an open policy engine.

In step 440, process 400 may include implementing the determination of whether the network access request 103 is authorized. If the network access request 103 is authorized, process 400 proceeds to step 450. If the network access result is not authorized, process 400 proceeds to step 460.

In step 450, process 400 may dynamically inject a secret 110 into the network access request 103. In some embodiments, the secret 110 is not made available to process 400. In some embodiments, the secret 110 is one of a plurality of secrets (e.g., stored in a secured repository, e.g., CyberArk™ vault). In some embodiments, the plurality of secrets is stored in a secured repository separate from the development and operations pipeline. In some embodiments, the secured repository is an access restricted database (e.g., integrated within or separate from the development and operations pipeline). In some embodiments, the secret 110 is only available through decryption during the injection into the network access request 103. To access the secret 110, decryption may then be performed using a symmetric or asymmetric cryptographic key. In some embodiments, after the secret 110 is injected into the network access request 103, the secret 110 is re-encrypted and is not made available to process 400. In some embodiments, the secret 110 is a pre-defined or direct secret, which may be the secret present in the network access request 103 for authorization. For example, the pre-defined secret credentials may be a username and password that are authorized using basic authentication or another authentication method. In some embodiments, basic authentication is a method used to verify credentials, such as a username and password. In some embodiments, the secret 110 is a derived secret (e.g., derived from data that can yield the secret based on a computation or algorithm). In some embodiments, the derived secret may be the injected secret that may be the original secret presented for injection into the network access request. In other embodiments, the derived secret may be a secret retrieved from the secret store according to the rule set. In other embodiments, the derived secret may be a secret retrieved from an application programming interface that generates temporary access tokens.

In some embodiments, the system is configured to send a notification upon the injecting of the secret into the network access request. The notification may be an email, text, alert, or other similar type of notification. For example, the notification may be provided in a graphical user interface or in a message format. The notification may be received by a system administrator, a user making the request, a user associated with an application making the request, etc.

In some embodiments, injecting the secret 110 is based on process attributes associated with a role with privileges different than the privileges originally associated with the process. The attributes associated with the process may include, for example, a process identification, process command binary attributes, a script invoked by the process, process loaded modules, a process pedigree, or information associated with the process operating system, etc. In some embodiments, a role may be a set of software programs that enable a server to perform specific functions for users or computers on a network. A privilege may be an authority delegation for making changes to a computer system. In some embodiments, a privilege is a special authorization that is granted to particular users, identities, instances, or applications to perform security or other operations. For example, there may be users with normal privileges that allow for certain actions within a system and users with administrative privileges that allow for broader or even full actions within a system.

In some embodiments, process 400 may dynamically monitor activity associated with the development and operations pipeline. Such monitoring may be performed by monitoring function 106, as discussed above. The monitoring may be in real-time as a development and operations pipeline is used, or offline (e.g., based on stored data reflecting the usage of the pipeline). In some embodiments, the monitored activity is displayed for observation using a user interface. For example, all of results of the investigation performed by investigation module 105 may be displayed graphically. This may include, in some embodiments, the result of the investigation from step 420.

In step 460, process 400 may include not injecting a secret into the network access request. Step 460 may be reached if a determination is made in step 440 to not authorize the network access request 103. In some embodiments, in step 460, process 400 blocks the network access request. Further, in some embodiments step 460 may be performed in an insufficient confidence threshold is met to authorize the network access request 103. That is, if the confidence level for authorization is below a set amount (e.g., below 90%), authorization may be denied and process 400 may continue to step 460.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely handling secrets within a development and operations pipeline, the operations comprising:
   identifying a network access request for a process within the development and operations pipeline;
   accessing a result of at least one investigation, wherein the at least one investigation includes at least one of:
   monitoring the process behavior,
   performing a process attestation, or
   performing an inspection of the network access request;
   determining, based on the result of the at least one investigation, whether to authorize the network access request; and
   conditional on whether the network access request is authorized, dynamically injecting a decrypted or unencrypted secret into the network access request, wherein the secret is not made available to the process itself and the secret is encrypted after the injection.

2. The non-transitory computer readable medium of claim 1, wherein the performing an inspection of the network access request comprises inspecting at least one of:
   network access request metadata;
   network access request connection parameters; or
   information embedded within the network access request.

3. The non-transitory computer readable medium of claim 1, wherein the process attestation comprises inspecting at least one of:
   attributes associated with the process; or
   information related to a computing platform hosting the process.

4. The non-transitory computer readable medium of claim 3, wherein the attributes associated with the process include at least one of:
   process identification;
   process command binary attributes;
   a script invoked by the process;
   process loaded modules;
   process pedigree; or
   information associated with the process operating system.

5. The non-transitory computer readable medium of claim 4, wherein the process modules are dynamically loaded.

6. The non-transitory computer readable medium of claim 3, wherein the information embedded with the network access request further comprises a payload inspection of information passed inside a request.

7. The non-transitory computer readable medium of claim 1, wherein the determining comprises an application of at least one rule selected from a set of rules defined based on one of: rule training implemented using an automated analysis algorithm, manual settings implemented by a user, or an algorithm selected by a user.

8. The non-transitory computer readable medium of claim 1, wherein the operations further comprise performing a security scan of the network access request and payload.

9. The non-transitory computer readable medium of claim 1, wherein the secret is one among a plurality of secrets stored in a secured repository separate from the pipeline.

10. The non-transitory computer readable medium of claim 9, wherein the secret is available decrypted only during the injection.

11. The non-transitory computer-readable medium of claim 1, wherein the injected secret is a pre-defined secret.

12. The non-transitory computer-readable medium of claim 1, wherein the injected secret is a derived secret.

13. The non-transitory computer-readable medium of claim 4, wherein based on the process attributes, injecting the secret is associated with a role with privileges different than the privileges originally associated with the process.

14. The non-transitory computer-readable medium of claim 1, wherein the operations further comprise dynamically monitoring activity associated with the development and operations pipeline.

15. The non-transitory computer-readable medium of claim 14, wherein the activity is displayed for observation using a user interface.

16. A computer-implemented method for securely handling secrets within a development and operations pipeline, the method comprising operations that, when executed by a computer processor, perform the steps of:
    identifying a network access request for a process within the development and operations pipeline;
    accessing a result of at least one investigation, wherein the at least one investigation includes at least one of:
    monitoring the process behavior,
    performing a process attestation, or
    performing an inspection of the network access request;
    determining, based on the result of the at least one investigation, whether to authorize the network access request; and
    conditional on whether the network access request is authorized, dynamically injecting a decrypted or unencrypted secret into the network access request, wherein the secret is not made available to the process itself and the secret is encrypted after the injection.

17. The computer-implemented method of claim 16, wherein a secure agent performs the method and has elevated privileges.

18. The computer-implemented method of claim 17, wherein the secure agent applies a rule selected from a set of rules.

19. The computer-implemented method of claim 18, wherein the set of rules is based on at least one of:
    time parameters;
    a comparison of binary signatures associated with the process;
    a list of allowed actions;
    a list of banned actions;
    a list of allowed targets;
    a list of banned targets;
    a source network;
    a secret authorization;
    a secret asserted by the process; or
    a pairing of the process and a target allowed for access by the process.

20. The computer-implemented method of claim 18, wherein the set of rules is dynamically updated using an automated analysis algorithm that is trained on monitored activity.

21. The computer-implemented method of claim 18, wherein the set of rules is configured by an administrator.

22. The computer-implemented method of claim 16, wherein the injecting of the secret is from a secured repository.

23. The computer-implemented method of claim 16, wherein the operations further comprise sending a notification upon receiving the network access request.

24. The computer-implemented method of claim 23, wherein the secure agent is configured to send a notification upon injecting of the secret into the network access request.

* * * * *